(12) United States Patent
Min et al.

(10) Patent No.: US 10,558,506 B1
(45) Date of Patent: Feb. 11, 2020

(54) SYSTEMS AND METHODS FOR PROVIDING RESTOCK NOTIFICATIONS USING A BATCH FRAMEWORK

(71) Applicant: Coupang, Corp., Seoul (KR)

(72) Inventors: Jie Min, Shanghai (CN); Zhongxing Wang, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/399,365

(22) Filed: Apr. 30, 2019

(51) Int. Cl.
  *G06F 9/54* (2006.01)
  *G06Q 30/06* (2012.01)
  *G06Q 10/08* (2012.01)

(52) U.S. Cl.
  CPC .......... *G06F 9/542* (2013.01); *G06Q 10/087* (2013.01); *G06Q 30/0611* (2013.01); *G06Q 30/0643* (2013.01)

(58) Field of Classification Search
  CPC .......... G06Q 30/0643; G06Q 30/0611; G06Q 10/087; G06F 9/542
  See application file for complete search history.

(56) References Cited

U.S. PATENT DOCUMENTS

| | | | | |
|---|---|---|---|---|
| 8,166,062 B1* | 4/2012 | McElroy | ........... | G06Q 30/02 707/769 |
| 2004/0002972 A1* | 1/2004 | Pather | ............. | G06F 9/542 |
| 2007/0282959 A1* | 12/2007 | Stern | ............... | G06Q 30/02 709/206 |
| 2015/0242805 A1* | 8/2015 | Sakurai | ............ | G06Q 30/06 705/28 |

* cited by examiner

*Primary Examiner* — Charles E Anya
(74) *Attorney, Agent, or Firm* — Finnegan, Henderson, Farabow, Garrett & Dunner LLP

(57) ABSTRACT

The embodiments of the present disclosure provide systems and methods for providing restock notification, comprising a memory storing instructions and at least one processor configured to execute the instructions. The processor may be configured to receive, from a user interface associated with a user, a first request for a restock notification associated with a product, and modify a database to assign a first status to the product. The processor may further be configured to receive a message indicating that the product is available for purchase, and modify the database to assign a second status to the product. The processor may configure a batch framework to periodically analyze the database to identify product with the second status assigned, and determine a notification schedule for sending the restock notification to the user. The processor may be configured to send the restock notification to the user based on the determined notification schedule.

18 Claims, 11 Drawing Sheets

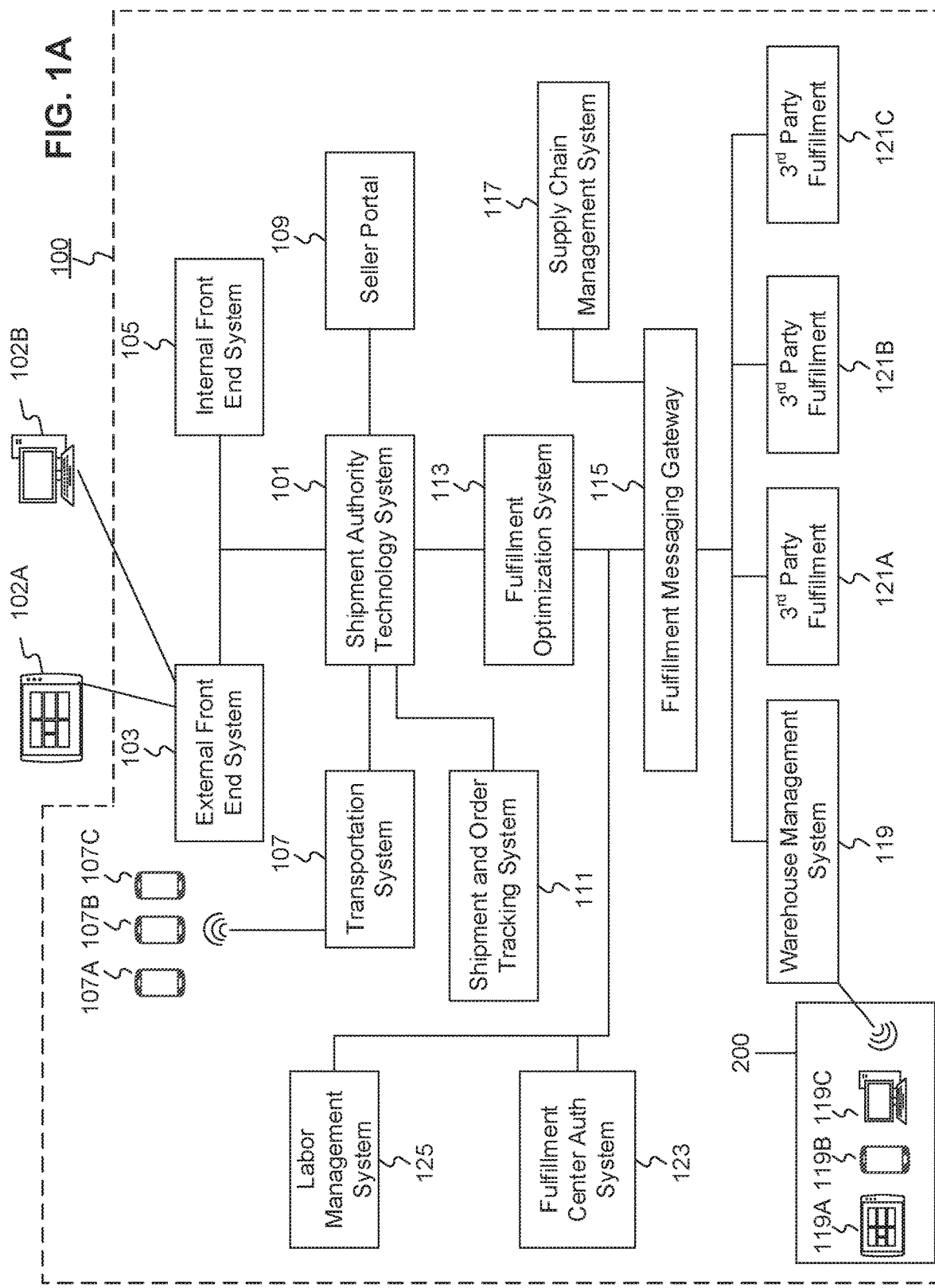

Favorites  Application                                                  login  Sign Up  Service center

[ all ]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

SYSTEMS AND METHODS FOR PROVIDING RESTOCK NOTIFICATIONS USING A BATCH FRAMEWORK

TECHNICAL FIELD

The present disclosure generally relates to computerized systems and methods for providing electronic restock notifications. In particular, embodiments of the present disclosure relate to inventive and unconventional systems related to using a batch framework to send restock notifications based on a notification schedule and avoid sending duplicate notifications.

BACKGROUND

Various types of computer-implemented systems and methods exist for electronically notifying a user when an out-of-stock item listed on a web site is restocked and becomes available for purchase. For example, many retail sales web sites and applications provide notification services through which users can subscribe to be notified by email, text message, and/or push notifications when an out-of-stock item becomes available. While these notifications are helpful, there has yet to be an efficient method for providing restock notifications that sends notifications during a time period when the user is active and that avoids sending duplicate notifications.

Today, many retailers provide various platforms for a user to purchase items, including but not limited to, mobile applications, web browsers, and mobile web browsers. A user may browse for items on a mobile application associated with a particular retailer, for example, and subscribe to be notified by email when an out-of-stock item becomes available. The user may also browse for items on a web browser associated with the particular retailer, and subscribe again to be notified by email when the out-of-stock item becomes available. Then, when the out-of-stock item becomes available, the user will receive duplicate restock notifications because the user subscribed to email notifications on the mobile application and the web browser.

In addition, while many computer-implemented systems and methods for providing restock notifications to users exist, conventional systems and methods typically send restock notifications as soon as it has been determined that the out-of-stock item is available for purchase. As such, if the out-of-stock item becomes available at 3 o'clock in the morning, conventional systems and methods will send restock notifications to users at 3 o'clock in the morning, when the users are most likely to be sleeping. Therefore, users may be more likely to miss the restock notifications and give up on the items, which may decrease the amount of revenue the retailers can make on their items.

Therefore, there is a need for improved systems and methods for providing restock notifications. In particular, there is a need for improved systems and methods for providing restock notifications based on a notification schedule customized for each user. In addition, there is a need for improved systems and methods for providing restock notifications that avoid sending duplicate notifications to users, even if they subscribe to restock notifications for a particular product multiple times.

SUMMARY

One aspect of the present disclosure is directed to a computer-implemented system for providing restock notifications. The system may comprise a memory storing instructions and at least one processor configured to execute the instructions. The at least one processor may be configured to execute the instructions to receive, from a user interface associated with a user, a first request for a restock notification associated with a product, modify a database to assign a first status to the product, receive a message indicating that the product is available for purchase, and modify the database to assign a second status to the product. The at least one processor may also configure a batch framework to periodically analyze the database to identify products with the second status assigned, and to determine a notification schedule for sending the restock notification to the user. The at least one processor may be configured to send the restock notification to the user based on the determined notification schedule.

In some embodiments, the user interface may comprise at least one of a mobile application programming interface, a web browser, a mobile web browser, or a cart web browser. In some embodiments, the first status may be indicative of a pending request for restock notification of an out-of-stock product, and the second status may indicate that the product is in-stock and the restock notification is ready to be sent to the user. In other embodiments, the message indicating that the product is available for purchase may comprise at least one of a product ID, an item ID, a vendor item ID, or a vendor item package ID. In some embodiments, the restock notification may comprise at least one of a push notification for a mobile application or an email notification.

In some embodiments, the at least one processor may be configured to execute the instructions to modify the database to assign a third status to the product. The third status may be indicative of a failure to send the restock notification to the user. The at least one processor may further configure the batch framework to apply a failover logic to resend the restock notification to the user based on the determined notification schedule. In some embodiment, the at least one processor may be configured to determine a quantity of the product after restocking, and send the restock notification to the user when the quantity of the product exceeds a predetermined threshold.

In some embodiments, the at least one processor may configure the batch framework to determine the notification schedule based on a time the user interacts with the user interface. In other embodiments, the notification schedule may comprise an alert type, and the at least one processor may be configured to adjust the alert type based on a scheduled time for sending the restock notification.

In yet another embodiment, the at least one processor may be configured to receive, from a second user interface associated with the user, a second request for a restock notification associated with a second product. The at least one processor may be configured to modify the database to assign the first status to the second product. The at least one processor may be configured to receive a second message indicating that the second product is available for purchase, and modify the database to assign the second status to the second product. The at least one processor may configure the batch framework to determine whether the first request is related to the second request. When the first request is related to the second request, the product and the second product may be the same. The at least one processor may be configured to send one restock notification to the user based on the determined notification schedule, in response to the first request and the second request, when the first request is related to the second request.

Another aspect of the present disclosure is directed to a computer-implemented method for providing restock notifications. The method may comprise receiving, from a user interface associated with a user, a first request for a restock notification associated with a product, and modifying a database to assign a first status to the product. The method may further comprise receiving a message indicating that the product is available for purchase, and modifying the database to assign a second status to the product. The method may further comprise configuring a batch framework to periodically analyze the database to identify products with the second status assigned, and determine a notification schedule for sending the restock notification to the user. The method may further comprise sending the restock notification to the user based on the determined notification schedule.

In some embodiments, the user interface may comprise at least one of a mobile application programming interface, a web browser, a mobile web browser, or a cart web browser. In some embodiments, the first status may be indicative of a pending request for restock notification of an out-of-stock product, and the second status may indicate that the product is in-stock and the restock notification is ready to be sent to the user. In some embodiments, the restock notification may comprise at least one of a push notification for a mobile application or an email notification.

In some embodiments, the method may comprise modifying the database to assign a third status to the product. The third status may be indicative of a failure to send the restock notification to the user. The method may further comprise configuring the batch framework to apply a failover logic to resend the restock notification to the user based on the determined notification schedule. In some embodiment, the method may comprise determining a quantity of the product after restocking, and sending the restock notification to the user when the quantity of the product exceeds a predetermined threshold.

In some embodiments, the method may further comprise configuring the batch framework to determine the notification schedule based on a time the user interacts with the user interface. In other embodiments, the notification schedule may comprise an alert type, and the method may further comprise adjusting the alert type based on a scheduled time for sending the restock notification.

In yet another embodiment, the method may comprise receiving, from a second user interface associated with the user, a second request for a restock notification associated with a second product, and modifying the database to assign the first status to the second product. The method may further comprise receiving a second message indicating that the second product is available for purchase, and modifying the database to assign the second status to the second product. The method may further comprise configuring the batch framework to determine whether the first request is related to the second request. When the first request is related to the second request, the product and the second product may be the same. The method may further comprise sending one restock notification to the user based on the determined notification schedule, in response to the first request and the second request, when the first request is related to the second request.

Yet another aspect of the present disclosure is directed to a computer-implemented system for providing restock notifications. The system may comprise a memory storing instructions and at least one processor configured to execute the instructions. The at least one processor may be configured to execute the instructions to receive, from a first user interface associated with a user, a first request for a restock notification associated with a first product, and receive, from a second user interface associated with the user, a second request for a restock notification associated with a second product. The at least one processor may be configured to modify a database to assign a first status to the first product and the second product. The first status may be indicative of a pending request for restock notification of an out-of-stock product. The at least one processor may be configured to receive a first message indicating that the first product is available for purchase and a second message indicating that the second product is available for purchase. The at least one processor may be configured to modify the database to assign a second status to the first product and the second product. The second status may indicate that a product is in-stock and the restock notification is ready to be sent to the user.

The at least one processor may also configure a batch framework to periodically analyze the database to identify products with the second status assigned, and determine a notification schedule for sending the restock notification to the user. The at least one processor may further configure the batch framework to determine whether the first request is related to the second request. When the first request is related to the second request, the first product and the second product may be the same.

The at least one processor may be configured to determine a quantity of the first product and the second product after restocking. The at least one processor may be configured to send one restock notification for the first product and the second product to the user based on the determine notification schedule when the first request is related to the second request, and when the quantity of the first product and the second product exceeds a predetermined threshold. The at least one processor may be configured to send a first restock notification for the first product and a second notification for the second product based on the determined notification schedule when the first request is not related to the second request, and when the quantity of the first product and the second product exceeds a predetermined threshold.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing electronic restock notifications using a batch framework.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
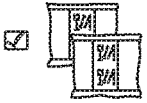
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
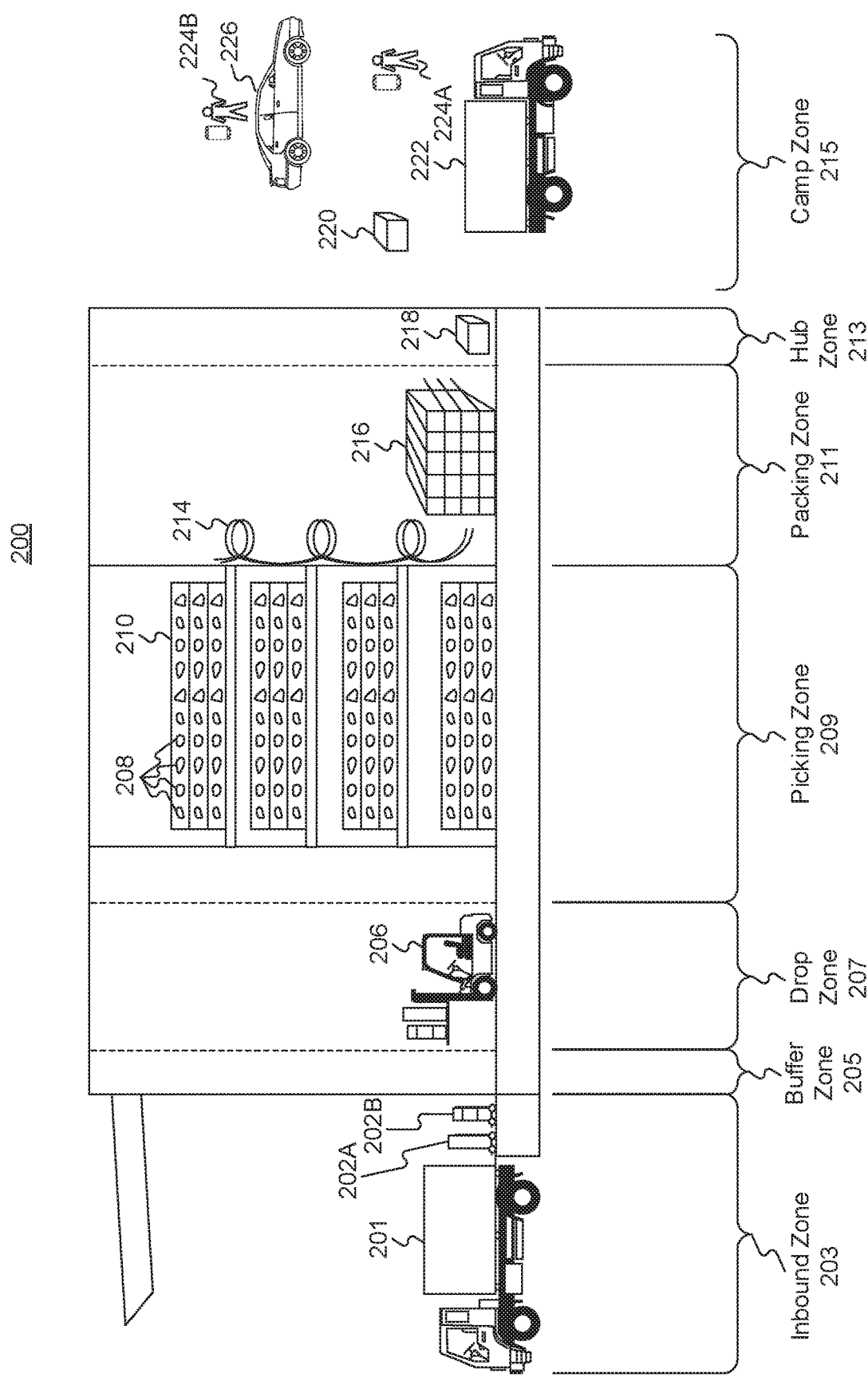
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
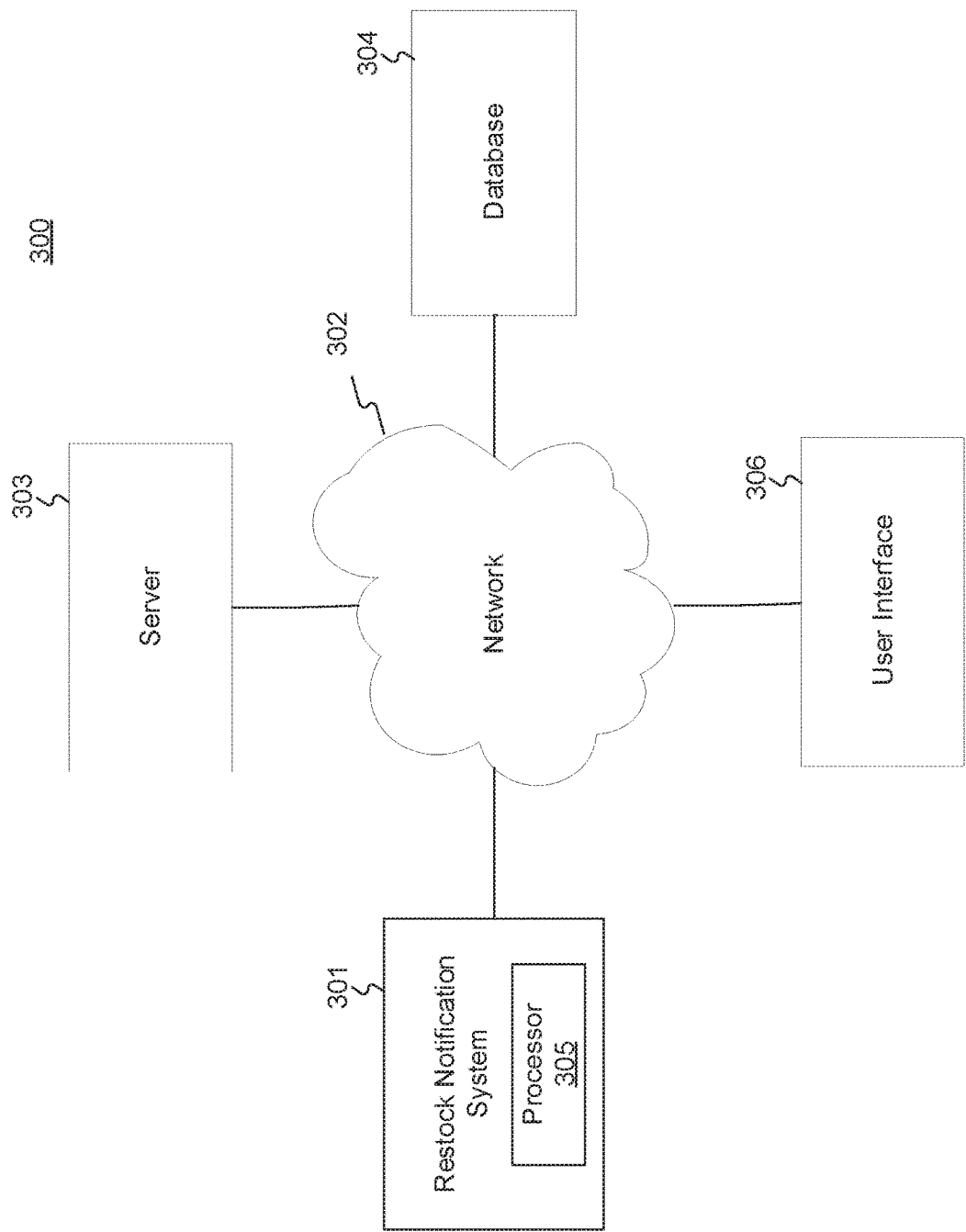
FIG. 3 is a schematic block diagram illustrating an exemplary embodiment of a system comprising a restock notification system for providing restock notifications.

Referring to FIG. 3, a schematic block diagram 300 illustrating an exemplary embodiment of a system comprising a restock notification system 301 for providing restock notifications. Restock notification system 301 may be associated with one or more systems in system 100 of FIG. 1A. For example, restock notification system 301 may be implemented as part of SCM system 117. Restock notification system 301, in some embodiments, may be implemented as a computer system that receives and stores inventory information, controls restock notifications, and sends restock notifications to one or more users (e.g., external front end system 103, shipment and order tracking system 111, and/or FO system 113). For example, restock notification system 301 may include one or more processors 305, which may receive a request for a restock notification associated with an out-of-stock product. In some embodiments, one or more processors 305 may receive the request for the restock notification from user interface 306 via network 302. One or more processors 305 may be configured to modify a database, such as database 304, to assign a status to the product indicating that there is a pending request for restock notification associated with the product. By way of example, database 304 may store an inventory of every product that is available for purchase by system 100 of FIG. 1A. Database 304 may further store information associated with each product, including but not limited to product identifier associated with each product and availability of each product. For example, if a particular product is out of stock, database 304 may assign an out-of-stock status to the particular product and store the status information.

In some embodiments, one or more processors 305 may receive from one or more systems in system 100 of FIG. 1A or from server 303, via network 302, a message indicating that the out-of-stock product is now back in-stock and available for purchase. One or more processors 305 may modify the database, such as database 304, to assign a different status to the product, indicating that the product is now available for purchase. Database 304 may assign the new status to the product and store this information.

In some embodiments, one or more processors 305 may implement a batch framework. The batch framework may be configured to analyze database 304 to identify products that have been assigned a status indicating that the products are back in-stock. The batch framework may be configured to analyze database 304 periodically or on a predetermined schedule. Advantageously, the batch framework may also be configured to determine a notification schedule for sending restock notifications to users, such that the users receive restock notifications as soon as the products are back in-stock, but also when the users are active. One or more processors 305 may be configured to send restock notifications to users based on the notification schedule determined by the batch framework.

System 300 may also comprise a network 302 and a server 303. Restock notification system 301, server 303, and database 304 may be connected and be able to communicate with each other via network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 902.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Server 303 may be a web server. Server 303, for example, may include hardware (e.g., one or more computers, including processors, storage, and input/output devices) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other.

Figure 4:
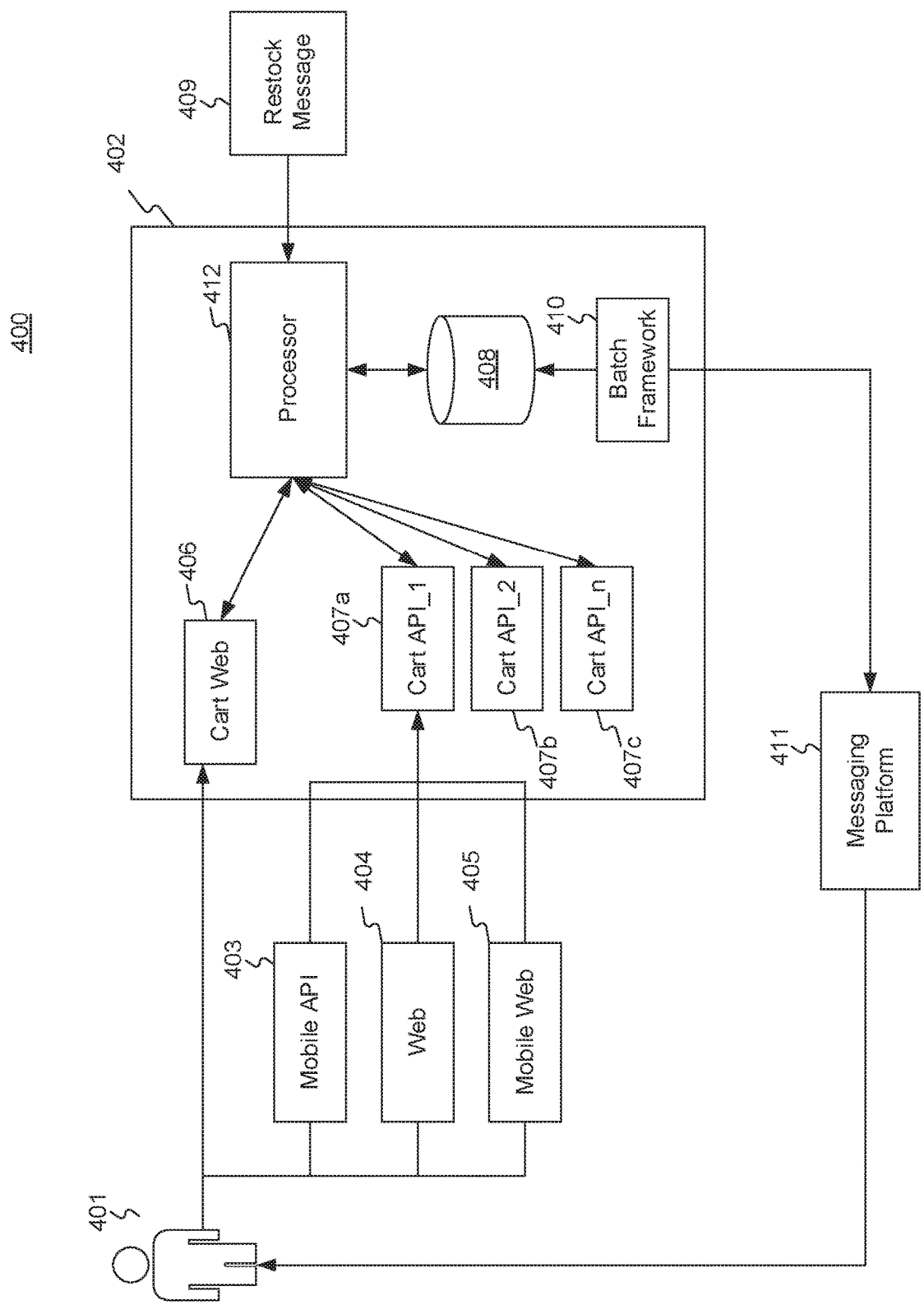
FIG. 4 is a schematic block diagram of an exemplary restock notification system for providing restock notifications.

FIG. 4 shows a schematic block diagram 400 illustrating an exemplary restock notification system 402 for providing restock notifications to user 401. Restock notification system 402 may be the same as restock notification system 301 in FIG. 3. As seen in FIG. 4, restock notification system 402 may comprise one or more processors 412, which may be configured to exchange data with user 401 via at least one of a mobile application programming interface (API) 403, web browser 404, mobile web browser 405, or cart web browser 406. By way of example, user 401 may access at least one of mobile API 403, web browser 404, mobile web browser 405, or cart web browser 406 to search for product and purchase products. User 401 may also access at least one of mobile API 403, web browser 404, mobile web browser 405, or cart web browser 406 to subscribe for restock notifications such that user 401 may be notified when an out-of-stock product is back in-stock. In some embodiments, user 401 may generate a user account in order to subscribe for restock notifications on at least one of mobile API 403, web browser 404, mobile web browser 405, or cart web browser 406. As such, user 401 may be required to sign into the account of user 401, by providing a user ID and password associated with the account, in order to subscribe for restock notifications.

When user 401 subscribes for and requests restock notifications via mobile API 403, web browser 404, and/or mobile web browser 405, one or more processors 412 may receive the request for restock notifications via one or more cart APIs 407a-c. One or more processors 412 may maintain a separate cart API 407*a*-*c* for each entry point of user 401. For example, cart API 407*a* may be associated with mobile API 403, such that one or more processors 412 may be configured to receive requests for restock notifications made from mobile API 403 via cart API 407*a*. Cart API 407*b* may be associated with web browser 404, such that one or more processors 412 may be configured to receive requests for restock notifications made from web browser 404 via cart API 407*b*. Similarly, cart API 407*c* may be associated with mobile web browser 405, such that one or more processors 412 may be configured to receive requests for restock notifications made from mobile web browser 405 via cart API 407*c*. In some embodiments, one or more processors 412 may be configured to directly receive requests for restock notifications made from cart web browser 406.

As discussed above, one or more processors 412 may be configured to store information associated with each product in database 408. Database 408 may be similar to database 304 in FIG. 3. While FIG. 4 illustrates database 408 inside restock notification system 402, database 408 may be located outside restock notification system 402 in some embodiments and may be configured to communicate with restock notification system 402 via network 302. In some embodiments, one or more processors 412 may be configured to modify database 408 to assign a status to each product. For example, when one or more processors 412 receive a request for a restock notification associated with a product via cart web browser 406, cart API 407*a*, cart API 407*b*, and/or cart API 407*c*, one or more processors 412 may determine that the product is currently out-of-stock. Then, one or more processors 412 may modify database 408 to assign a first status to the product indicating that the product is out-of-stock. As such, database 408 may store a list of products and information associated with each product, including the product's product identifier (e.g., stock keeping unit (SKU)), quantity of the product available, status indicating the availability of the product, and/or number of requests for restock notifications associated with the product. Database 408 may also store information associated with users requesting the restock notification, such as a list of user IDs associated with the users' request for restock notifications for each product. For example, database 408 may store a user ID associated with user 401 after user 401 has requested a restock notification for a particular product. Restock notification system 402 may prevent data other than approved data from being stored in database 408. For example, restock notification system 402 may only support user ID, user identification information, and/or user e-mail address to be stored in database 408. In other embodiments, when user 401 sends a request for restock notification for a particular product, one or more processors 412 may modify database 408 to assign a restock item ID associated with the particular product. The restock item ID may comprise information associated with the particular product, such as product ID, item ID, vendor item ID, or vendor item package ID associated with the particular product.

In some embodiments, one or more processors 412 may be configured to receive one or more restock messages 409, for example, from server 303. One or more restock messages 409 may indicate that a particular product is back in-stock and available for purchase by users. One or more restock messages 409 may identify a product identifier associated with each product that is back in-stock and may also identify a quantity of each product that is available. In some embodiments, one or more restock messages 409 may comprise an item ID and a vendor item ID associated with each product that is back in-stock. One or more processors 412 may retrieve other identification information from database 408 based on the vendor item ID associated with the product, such as a product ID or a vendor item package ID. Additionally or alternatively, one or more restock messages 409 may comprise at least one of a product ID, an item ID, a vendor item ID, or a vendor item package ID associated with each product that is back in-stock. Product ID may comprise a product identifier associated with a category of a product. Item ID may comprise a product identifier associated with a product that is indicative of one or more attributes of the product, e.g., color, size, manufacturer, material, or brand. Vendor item ID may comprise a product identifier associated with a product that also identifies a vendor of the product. Vendor item package ID may comprise a product identifier associated a collection of products sold by a vendor that are available for purchase (like a mobile phone and an associated phone case). The vendor item package ID may also identify the vendor of the collection of products. Then, one or more processors 412 may be configured to look up the product identifier in database 408 and modify database 408 to assign a second status to the product associated with the product identifier. The second status may indicate that the product is back in-stock and available for purchase. One or more processors 412 may also be configured to modify database 408 to change the quantity of each product available for purchase after restocking.

In some embodiments, restock notification system 402 may comprise a batch framework 410. One or more processors 412 may configure batch framework 410 to analyze database 408 to identify products that have been assigned a status indicating that the products are back in-stock. In some embodiments, one or more processors 412 may also configure batch framework 410 to analyze database 408 to determine the quantity of each product available. Batch framework 410 may be configured to analyze database 408 periodically or on a predetermined schedule. For example, batch framework 410 may be configured to analyze database 408 every 2 hours, every 5 hours, every 10 hours, every 24 hours, or twice a week. In other embodiments, batch framework 410 may be configured to analyze database 408 after every restock message 409 received by one or more processors 412. In some embodiments, batch framework 410 may comprise Apache Kafka, Spring Batch, or any open source software platform or open source framework capable of batch processing.

In some embodiments, batch framework 410 may periodically analyze database 408 to check for duplicate requests for restock notifications. For example, user 401 may request restock notifications for a particular product via mobile API 403. User 401 may also request restock notifications for the same particular product via mobile web browser 405. As discussed above, even though user 401 requested restock notifications for the same product, because user 401 requested restock notifications using two different entry points, i.e., mobile API 403 and mobile web browser 405, one or more processors 412 may receive the two requests separately via cart API 407*a* and cart API 407*c*, respectively. As such, one or more processors 412 may store the two requests associated with user 401 separately in database 408. When one or more processors 412 receives restock message 409 indicating that the product is back in-stock, one or more processors 412 may determine that there are two pending requests for restock notifications for the product. Instead of sending two duplicate restock notifications to user 401, batch framework 410 may analyze database 408 and determine that the two pending requests for restock notifications for the product are associated with the same user, i.e. user 401. Batch framework 410 may determine that the two pending requests for restock notifications are associated with the same user by identifying the user ID, for example, associated with the requests. When batch framework 410 determines that the two pending requests for restock notifications are both associated with user 401, batch framework 410 may generate a notification schedule such that one or more processors 412 only sends one restock notification for the same product to user 401, thereby preventing duplicate messages from being sent to users.

Advantageously, batch framework 410 may also be configured to determine a notification schedule for sending restock notifications to users, such that the users receive restock notifications as soon as the products are back in-stock, but also when the users are active. By way of example, one or more processors 412 may determine the user's activity trend on at least one of mobile API 403, web browser 404, mobile web browser 405, or cart web browser 406. In some embodiments, one or more processors 412 may determine the user's activity trend based on a number of requests for restock notifications received. One or more processors 412 may monitor the number of requests for restock notifications received, for example, per minute each day. Based on the number of requests for restock notifications received, one or more processors 412 may determine a timeframe, during which one or more processors 412 is least likely to receive requests for restock notifications, for example between 2 AM and 7 AM. In addition, based on the user's determined activity trend, one or more processors 412 may determine a timeframe, during which the user is most likely to be active on at least one of mobile API 403, web browser 404, mobile web browser 405, or cart web browser 406.

One or more processors 412 may store the user's activity trend information and the timeframe information in database 408. Based on the user's information stored in database 408, batch framework 410 may determine a notification schedule for sending restock notifications to users. Accordingly, batch framework 410 may allow one or more processors 412 to send restock notifications to the user within a timeframe, during which the user would most likely check the restock notifications. Therefore, batch framework 410 may determine a notification schedule that is customized for each user based on each user's activity trend on at least one of mobile API 403, web browser 404, mobile web browser 405, or cart web browser 406.

In some embodiments, batch framework 410 may also determine the notification schedule such that one or more processors 412 does not send a restock notification to the user outside of the timeframe, during which the user would most likely check the restock notification. In some embodiments, batch framework 410 may generate the notification schedule such that one or more processors 412 does not send restock notifications to users after a certain time, for example, midnight. In other embodiments, determining the notification schedule may comprise determining an alert type for a restock notification. Batch framework 410 may determine a notification schedule such that one or more processors 412 may be configured to adjust the alert type of the restock notification based on the notification schedule. For example, batch framework 410 may generate the notification schedule such that one or more processors 412 may be configured to mute any restock notifications that are sent to users after a certain time, such as midnight. Adjusting the alert type of the restock notification may comprise adjusting the volume of the notification, adjusting the frequency of the notification, adjusting the display of the notification, or any combination thereof.

In some embodiments, one or more processors 412 may determine the notification schedule based on each user's activity status. For example, one or more processors 412 may implement batch framework 410 to obtain a real-time status of each user's activity status, based on each user's session. By way of example, batch framework 410 may determine if the user is "online" or active during the user's session or if the user is "idle," "offline," or inactive during the user's session on at least one of mobile API 403, web browser 404, mobile web browser 405, or cart web browser 406. Based on the user's activity status, batch framework 410 may determine a notification schedule for sending restock notifications. By way of example, batch framework 410 may determine a notification schedule such that restock notifications are sent to the user only when the user is "online."

In other embodiments, one or more processors 412 may determine a quantity of the product after restocking prior to sending the restock notification. For example, after receiving restock message 409 for a particular product, one or more processors 412 may determine a quantity of the product after restocking. One or more processors 412 may compare the quantity of the product after restocking to a predetermined threshold and, based on the comparison, determine whether to send a restock notification to the user. For example, if the quantity of the product after restocking is less than the predetermined threshold, one or more processors 412 may not send the restock notification until the quantity of the product exceeds the predetermined threshold. Similarly, if the quantity of the product after restocking exceeds the predetermined threshold, one or more processors 412 may send the restock notification to the user. The predetermined threshold may vary for each product, depending on consumer demand for each product. For example, the predetermined threshold for each product may be directly proportional to the consumer demand for each product, in order to prevent each product from going out-of-stock quickly.

In some embodiments, one or more processors 412 may be configured to send restock notifications to users based on the notification schedule determined by batch framework 410. One or more processors 412 may be configured to send restock notifications to users using a messaging platform 411. Messaging platform 411 may comprise any Internet infrastructure that is capable of exchanging messages to users. For example, message platforms 411 may comprise e-mails, short message services (SMS), software applications, APIs, instant messaging, or any combination thereof. In some embodiments, users may be able to select their preferred messaging platform 411, for example, by logging into their profiles. For example, users may be able to choose to receive restock notifications via email or via push notifications through a mobile application, such as mobile API 403.

In some embodiments, one or more processors 412 may be configured to modify database 408 to update the status of restock notifications. By way of example, database 408 may comprise a list of products and information associated with each product, including whether any restock notifications have been sent to users for each product. For example, when one or more processors 412 receives restock message 409 for a particular product and sends a restock notification to user 401 via messaging platform 411 based on a notification schedule generated by batch framework 410, one or more processors 412 may modify database 408 to assign another status to the particular product. The status may indicate that a restock notification for the particular product has been sent to the user. If the restock notification fails to send to the user, one or more processors 412 may modify database 408 to assign yet another status to the particular product. The status may indicate that the restock notification failed to send to the user. Batch framework 410 may periodically analyze database 408 to identify products, for which there is a status, indictive of a failure to send restock notifications, assigned. When batch framework 410 identifies a particular product with a status assigned that indicates a failure to send restock notifications, batch framework 410 may apply a failover logic to resend the restock notifications based on a determined notification schedule.

Figure 5:
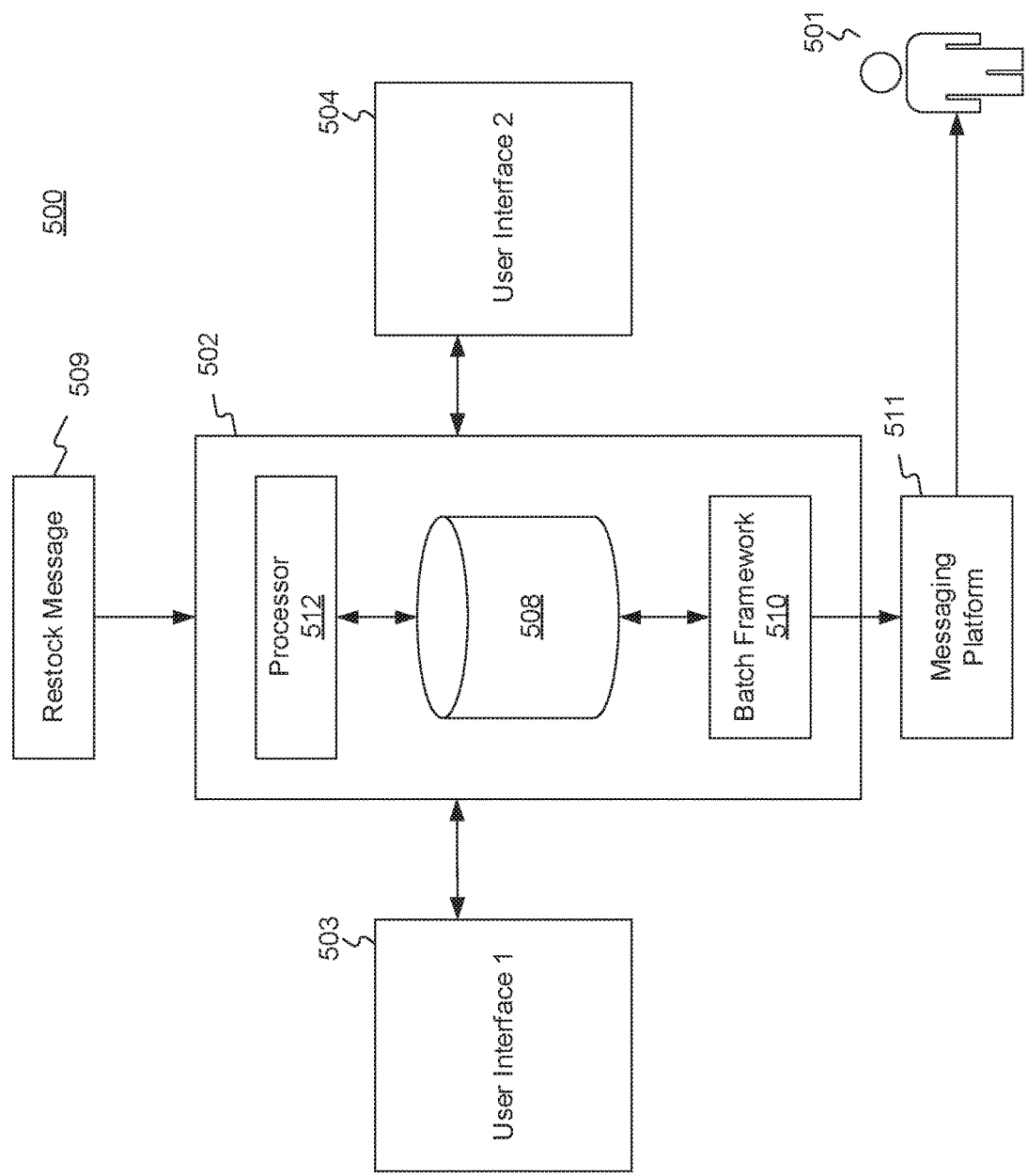
FIG. 5 is another schematic block diagram of an exemplary restock notification system for providing restock notifications.

FIG. 5 a schematic block diagram 500 of an exemplary restock notification system 502 for providing restock notifications to user 501. Restock notification system 502 may be similar to restock notification system 402 in FIG. 4. As seen in FIG. 5, restock notification system 502 may comprise one or more processors 512, which may be configured to exchange data with a first user interface 503 and a second user interface 504. First and second user interfaces 503, 504 may comprise at least one of mobile API (such as mobile API 403), web browser (such as web browser 404), mobile web browser (such as web browser 405), or cart web browser (such as cart web browser 406). While FIG. 5 illustrates two user interfaces 503, 504, restock notification system 502 may be configured to exchange data with more than two user interfaces, for example, thousands of user interfaces.

Similar to one or more processors 412 in FIG. 4, one or more processors 512 may be configured to receive requests for restock notifications from first user interface 503 and second user interface 504. After receiving the requests for restock notifications, one or more processors 512 may determine that the product(s) associated with the requests are out-of-stock and modify database 508 to assign a status to each product. The status may indicate that the product is out-of-stock. One or more processors 512 may also store information associated with users requesting the restock notification in database 508, such as a list of user IDs associated with users request restock notifications for each product.

In some embodiments, one or more processors 512 may be configured to receive one or more restock messages 509, for example, from server 303. Similar to restock message 409 in FIG. 4, one or more restock messages 509 may indicate that a particular product is back in-stock and available for purchase by users. One or more restock messages 509 may identify a product identifier associated with each product that is back in-stock and may also identify a quantity of each product that is available. Additionally or alternatively, one or more restock messages 509 may comprise at least one of a product ID, an item ID, a vendor item ID, or a vendor item package ID associated with each product that is back in-stock. Product ID may comprise a product identifier associated with a category of a product. Item ID may comprise a product identifier associated with a product that is indicative of one or more attributes of the product, e.g., color, size, manufacturer, material, or brand. Vendor item ID may comprise a product identifier associated with a product that also identifies a vendor of the product. Vendor item package ID may comprise a product identifier associated a collection of products sold by a vendor that are available for purchase. The vendor item package ID may also identify the vendor of the collection of products. Then, one or more processors 512 may be configured to look up the product identifier in database 508 and modify database 508 to assign a second status to the product associated with the product identifier. The second status may indicate that the product is back in-stock and available for purchase. One or more processors 512 may also be configured to modify database 508 to change the quantity of each product available for purchase after restocking.

Similar to restock notification system 402 in FIG. 4, restock notification system 502 may comprise a batch framework 510. One or more processors 512 may configure batch framework 510 to analyze database 508 to identify products that have been assigned a status indicating that the products are back in-stock. In some embodiments, one or more processors 512 may also configure batch framework 510 to analyze database 508 to determine the quantity of each product available. Batch framework 510 may be configured to analyze database 408 periodically or on a predetermined schedule. For example, batch framework 510 may be configured to analyze database 508 every 2 hours, every 5 hours, every 10 hours, every 24 hours, or twice a week. In other embodiments, batch framework 510 may be configured to analyze database 508 after every restock message 509 received by one or more processors 512.

In some embodiments, batch framework 510 may periodically analyze database 508 to check for duplicate requests for restock notifications. For example, user 501 may send a first request for restock notifications for a product via first user interface 503. User 501 may also send a second request for restock notifications for a product via second user interface 504. Batch framework 510 may determine that the first request and the second request are both from user 501 by, for example, identifying a user ID associated with each request. Batch framework 510 may then determine whether the first request is related to the second request. For example, batch framework 510 may determine whether the product associated with the first request for restock notifications is the same as the product associated with the second request for restock notifications. If the two products associated with the first and second requests are the same, batch framework 510 may determine that the first request and the second request are related. When batch framework 510 determines that the two requests for restock notifications are related, batch framework 510 may generate a notification schedule such that one or more processors 512 only sends one restock notification for the product to user 501, thereby preventing duplicate messages from being sent to users.

In other embodiments, batch framework 510 may determine that first user interface 503 is associated with user 501 and second user interface 504 is associated a different user. One or more processors 502 may receive a first request for restock notifications of a first product via first user interface 503 and a second request for restock notifications of a second product via second user interface 504. Even if the first product and the second product are the same, when batch framework 510 determines that first user interface 503 is not related to second user interface 504, batch framework 510 may send a first restock notification to user 501 associated with first user interface 503 and a second restock notification to the different user associated with second user interface 504.

Advantageously, batch framework 510 may also be configured to determine a notification schedule for sending restock notifications to users, such that the users receive restock notifications as soon as the products are back in-stock, but also when the users are active. By way of example, one or more processors 512 may determine the user's activity trend on at least one of first user interface 503 or second user interface 504. Based on the user's activity trend determined, one or more processors 512 may determine a timeframe, during which the user is most likely to be active on at least one of first user interface 503 or second user interface 504. One or more processors 512 may store the user's activity trend information and the timeframe information in database 508. Based on the user's information stored in database 508, batch framework 510 may determine a notification schedule for sending restock notifications to users. Accordingly, batch framework 510 may allow one or more processors 512 to send restock notifications to the user within a timeframe, during which the user would most likely check the restock notifications. Therefore, batch framework 510 may determine a notification schedule that is customized for each user based on each user's interaction with at least one of first user interface 503 or second user interface 504.

In some embodiments, batch framework 510 may also determine the notification schedule such that one or more processors 512 does not send a restock notification to the user outside of the timeframe, during which the user would most likely check the restock notification. In some embodiments, batch framework 510 may generate the notification schedule such that one or more processors 512 does not send restock notifications to users after a certain time, for example, midnight. In other embodiments, determining the notification schedule may comprise determining an alert type for a restock notification. Batch framework 510 may determine a notification schedule such that one or more processors 512 may be configured to adjust the alert type of the restock notification based on the notification schedule. For example, batch framework 510 may generate the notification schedule such that one or more processors 512 may be configured to mute any restock notifications that are sent to users after a certain time, such as midnight.

In some embodiments, one or more processors 512 may be configured to send restock notifications to users based on the notification schedule determined by batch framework 510. One or more processors 512 may be configured to send restock notifications to users using a messaging platform 511. Messaging platform 511 may comprise any Internet infrastructure that is capable of exchanging messages to users. For example, messaging platforms 511 may comprise e-mails, short message services (SMS), social network services (SNSs), software applications, APIs, instant messaging services, or any combination thereof. In some embodiments, users may be able to select their preferred messaging platform 511, for example, by logging into their profiles. For example, users may be able to choose to receive restock notifications via email or via push notifications through a mobile application.

As discussed in reference to FIG. 4, if the restock notification fails to send to the user, one or more processors 512 may modify database 508 to assign a status to the particular product, which may indicate that the restock notification failed to send to the user. Batch framework 510 may periodically analyze database 508 to identify products, for which there is a status, indictive of a failure to send restock notifications, assigned. When batch framework 510 identifies a particular product with a status assigned that indicates a failure to send restock notifications, batch framework 510 may apply a failover logic to resend the restock notifications based on a determined notification schedule.

Figure 6:
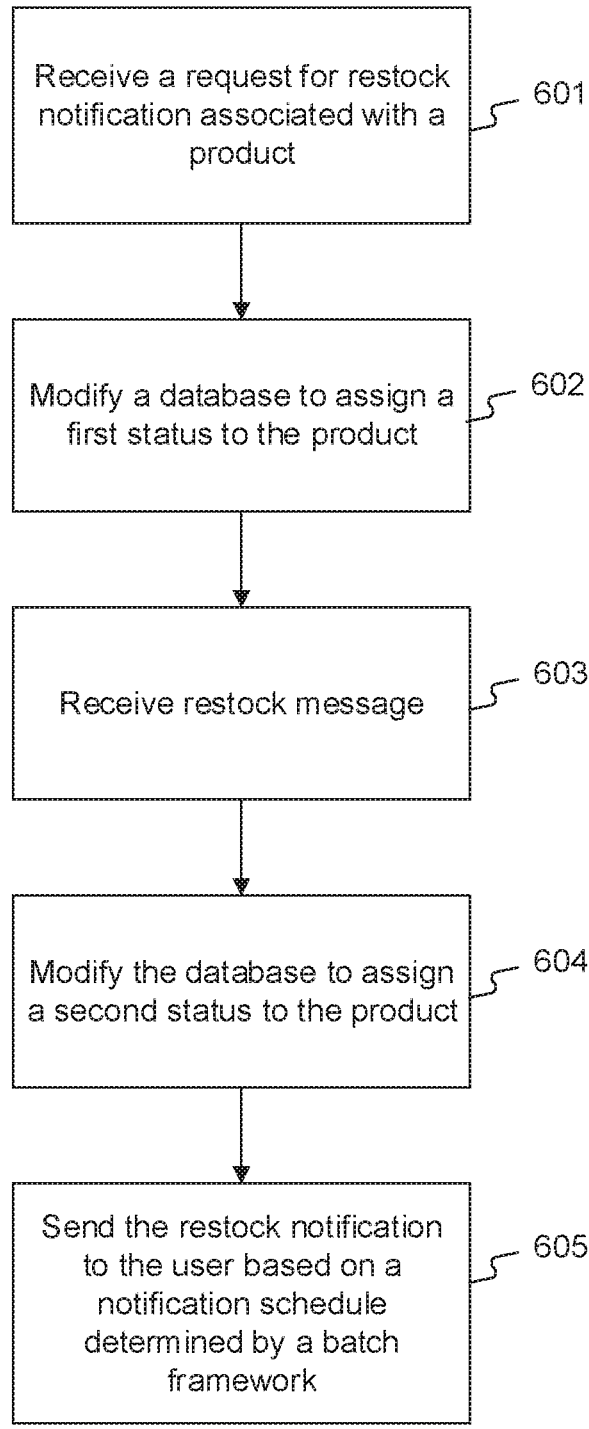
FIG. 6 is a flowchart illustrating an exemplary embodiment of a method for providing restock notifications.

FIG. 6 is a flow chart illustrating an exemplary method 600 for providing restock notifications. This exemplary method is provided by way of example. Method 600 shown in FIG. 6 can be executed or otherwise performed by one or more combinations of various systems. Method 600 as described below may be carried out by restock notification system 301, as shown in FIG. 3, by way of example, and various elements of restock notification system 301 are referenced in explaining the method of FIG. 6. Each block shown in FIG. 6 represents one or more processes, methods, or subroutines in the exemplary method 600. Referring to FIG. 6, exemplary method 600 may begin at block 601.

At block 601, one or more processors 305 may receive a request for restock notification associated with a product. In some embodiments, a user may send a request for restock notification via at least one of mobile API 403, web browser 404, mobile web browser 405, or cart web browser 406. One or more processors 305 may, then, receive the request for restock notification via at least one of cart APIs 407a-c or directly through cart web browser 406.

Once one or more processors 305 receives the request for restock notification, method 600 may proceed to block 602. At block 602, one or more processors 305 may modify a database, such as database 408 to assign a first status to the product. As discussed above in reference to FIG. 4, database 408 may store an inventory of every product that is offered for purchase, as well as information associated with each product, including the product's product identifier (e.g., stock keeping unit (SKU)), quantity of the product available, status indicating the availability of the product, and/or number of requests for restock notifications associated with the product. Accordingly, at block 602, one or more processors 305 may modify database 408, for example, to assign a first status to the product, which may indicate that the product is out-of-stock.

At block 603, one or more processors 305 may receive a restock message, such as restock message 409 in FIG. 4. The restock message may indicate that the out-of-stock product is back in-stock and available for purchase by users. The restock message may identify a product identifier associated with the product and may also identify a quantity of the product that is available after restocking. Additionally or alternatively, the restock message may comprise at least one of a product ID, an item ID, a vendor item ID, or a vendor item package ID associated with the product. Product ID may comprise a product identifier associated with a category of a product. Item ID may comprise a product identifier associated with a product that is indicative of one or more attributes of the product, e.g., color, size, manufacturer, material, or brand. Vendor item ID may comprise a product identifier associated with a product that also identifies a vendor of the product. Vendor item package ID may comprise a product identifier associated a collection of products sold by a vendor that are available for purchase. The vendor item package ID may also identify the vendor of the collection of products.

After receiving the restock message at block 603, method 600 may proceed to block 604. At block 604, one or more processors 305 may be configured to look up the product identifier in database 408 and modify database 408 to assign a second status to the product associated with the product identifier. The second status may indicate that the product is back in-stock and available for purchase. One or more processors 305 may also be configured to modify database 408 to change the quantity of the product available for purchase after restocking.

Method 600 may proceed to block 605, at which one or more processors 305 may send the restock notification to the user based on a notification schedule determined by a batch framework, such as batch framework 410. In some embodiments, the restock notification sent to the user for a particular product may comprise at least one of a receiver name (e.g., name of the user), a product name (e.g., name of the particular product that is back in-stock), an image of the particular product, or a link associated with the particular product. The link associated with the particular product may be a Single Detail Page (SDP) link, through which the user could access an SDP that shows detailed information associated with the particular product. As discussed above in reference to FIG. 4, one or more processors 305 may configure the batch framework to analyze database 508 to identify products that have been assigned the second status, which indicates that the product is back in-stock. In some embodiments, one or more processors 305 may also configure the batch framework to analyze database 508 to determine the quantity of each product available. The batch framework may identify products that have been assigned the second status and the products, for which there is a pending request for restock notification. For the product with a pending request for restock notification, the batch framework may determine a notification schedule for sending the restock notification to the user.

For example, the batch framework may be configured to determine a notification schedule for sending restock notifications to users, such that the users receive restock notifications as soon as the products are back in-stock, but also when the users are active. By way of example, one or more processors 305 may determine the user's activity trend on at least one of mobile API 403, web browser 404, mobile web browser 405, or cart web browser 406. Based on the user's activity trend determined, one or more processors 305 may determine a timeframe, during which the user is most likely to be active on at least one of mobile API 403, web browser 404, mobile web browser 405, or cart web browser 406. One or more processors 305 may store the user's activity trend information and the timeframe information in database 408. Based on the user's information stored in database 408, the batch framework may determine a notification schedule for sending restock notifications to users. Accordingly, the batch framework may allow one or more processors 305 to send restock notifications to the user within a timeframe, during which the user would most likely check the restock notifications. Therefore, the batch framework may determine a notification schedule that is customized for each user based on each user's activity trend on at least one of mobile API 403, web browser 404, mobile web browser 405, or cart web browser 406.

In some embodiments, the batch framework may also determine the notification schedule such that one or more processors 305 does not send a restock notification to the user outside of the timeframe, during which the user would most likely check the restock notification. In other embodiments, the batch framework may determine a notification schedule such that one or more processors 305 may be configured to adjust the alert type of the restock notification based on the notification schedule. For example, the batch framework may generate the notification schedule such that one or more processors 305 may be configured to mute any restock notifications that are sent to users after a certain time, such as midnight.

Based on the notification schedule determined by the batch framework, one or more processors 305 may send the restock notification to the user via one or more messaging platforms, such as messaging platform 411. Messaging platform 411 may comprise any Internet infrastructure that is capable of exchanging messages to users. For example, message platforms 411 may comprise e-mails, short messsage services (SMS), software applications, APIs, instant messaging, or any combination thereof. In some embodiments, users may be able to select their preferred messaging platform 411, for example, by logging into their profiles. For example, users may be able to choose to receive restock notifications via email or via push notifications through a mobile application, such as mobile API 403.

Figure 7:
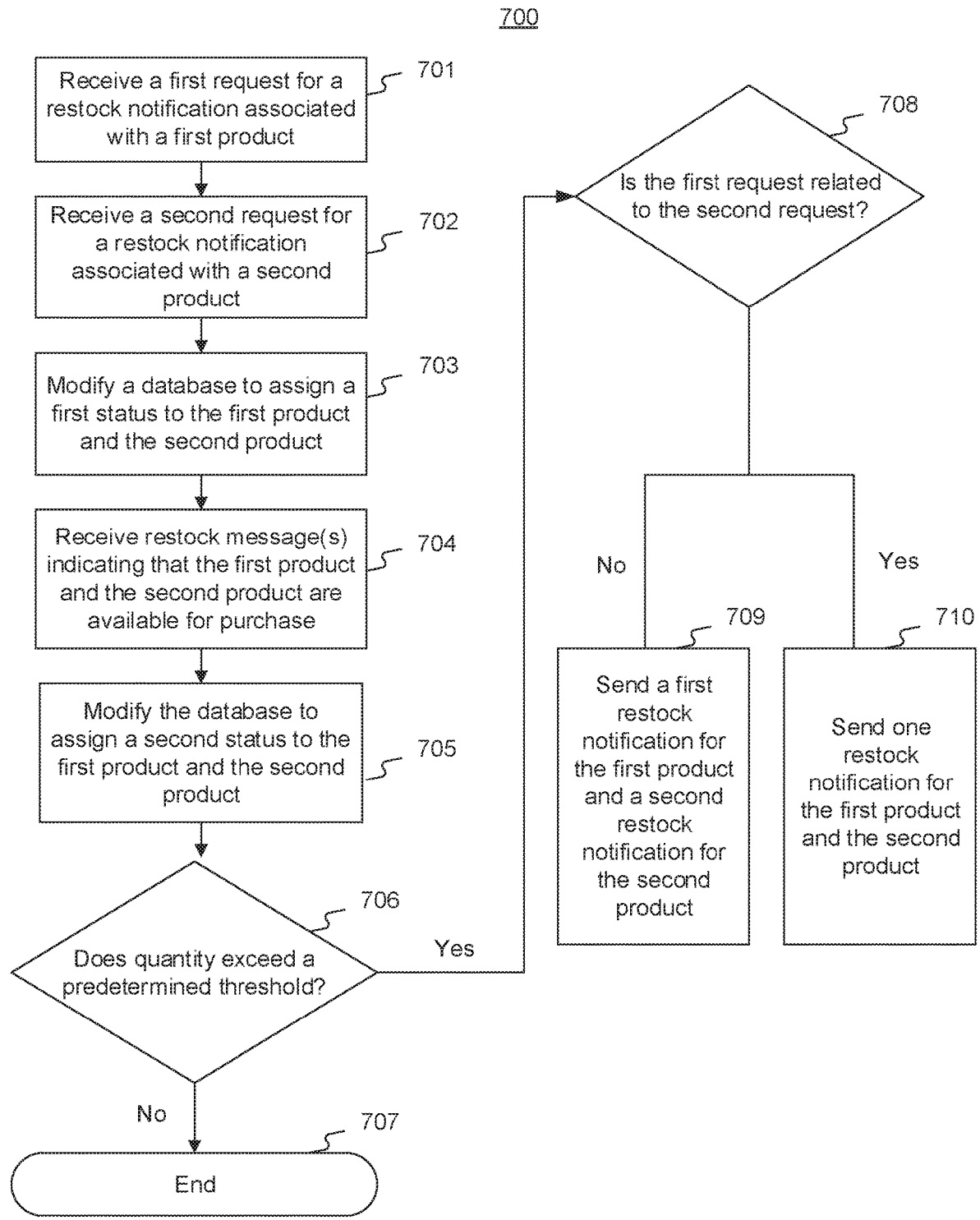
FIG. 7 is a flowchart illustrating another exemplary embodiment of a method for providing restock notifications.

FIG. 7 is a flow chart illustrating method 700 for providing restock notifications. This exemplary method is provided by way of example. Method 700 shown in FIG. 7 can be executed or otherwise performed by one or more combinations of various systems. Method 700 as described below may be carried out by restock notification system 301, as shown in FIG. 3, by way of example, and one or more elements of restock notification system 301 are referenced in explaining the method of FIG. 7. Each block shown in FIG. 7 represents one or more processes, methods, or subroutines in the exemplary method 700. Referring to FIG. 7, exemplary method 700 may begin at block 701.

At block 701, one or more processors 305 may receive a first request for a restock notification associated with a first product. At block 702, one or more processors 305 may receive a second request for a restock notification associated with a second product. In some embodiments, the first request and the second request may be from the same user. In other embodiments, the first request may be from a first user and the second request may be from a second user. A user may send a request for restock notification via at least one of mobile API 403, web browser 404, mobile web browser 405, or cart web browser 406. One or more processors 305 may, then, receive the first request and the second request for restock notifications via at least one of cart APIs 407a-c or directly through cart web browser 406.

After receiving the first and second requests for restock notification, method 700 may proceed to block 703. At block 703, one or more processors 305 may modify a database, such as database 408, to assign a first status to the first product and the second product. The first status may indicate that the first product and the second product are out-of-stock. As discussed above in reference to FIG. 4, database 408 may store information associated with the first product and the second product, including but not limited to product identifiers associated with the first and second products (e.g., stock keeping unit (SKU)), quantities of the first and second products available, status indicating the availability of the first and second products, number of requests for restock notifications pending for the first and second products, and/or status indicating whether restock notifications for the first and second products have been sent.

At block 704, one or more processors 305 may receive restock message(s), such as one or more restock messages 409 in FIG. 4. The restock message(s) may indicate that the first product and the second product are back in-stock and available for purchase. The restock message(s) may identify product identifiers associated with the first and second products and may also identify quantities of the first and second products that are available after restocking. Additionally or alternatively, the restock message(s) may comprise at least one of a product ID, an item ID, a vendor item ID, or a vendor item package ID associated with each of the first and second products. The product ID may comprise a product identifier associated with a category of a product. The item ID may comprise a product identifier associated with a product that is indicative of one or more attributes of the product, e.g., color, size, manufacturer, material, or brand. The vendor item ID may comprise a product identifier associated with a product that also identifies a vendor of the product. The vendor item package ID may comprise a product identifier associated with a collection of products sold by a vendor that are available for purchase. The vendor item package ID may also identify the vendor of the collection of products.

After receiving the restock message(s) at block 704, method 700 may proceed to block 705. At block 705, one or more processors 305 may be configured to look up the product identifiers in database 408 and modify database 408 to assign a second status to the first and second products associated with the product identifiers. The second status may indicate that the first and second products are back in-stock and available for purchase. One or more processors 305 may also be configured to modify database 408 to change the quantities of the first and second products available for purchase after restocking.

After assigning the second status to the first and second products, method 700 may proceed to block 706. At block 706, one or more processors 305 may determine whether quantities of the first and second products exceed a predetermined threshold. For example, after receiving restock message(s) for the first and second products at block 704, one or more processors 305 may determine quantities of the first and second products that are available. One or more processors 305 may compare the quantities of the first and second products after restocking to a predetermined threshold and, based on the comparison, determine whether to send a restock notification to the user. For example, if the quantity of each of the first and second products after restocking is less than the predetermined threshold, one or more processors 305 may not send the restock notification until the quantity of each product exceeds the predetermined threshold. Similarly, if the quantity of each of the first and second products after restocking exceeds the predetermined threshold, one or more processors 305 may proceed to send the restock notification to the user. The predetermined threshold may vary for each product, depending on consumer demand for each product. For example, the predetermined threshold for each product may be directly proportional to the consumer demand for each product, in order to prevent each product from going out-of-stock quickly.

If one or more processors 305 determines that the quantity of the first product and/or the second product is less than the predetermined threshold, method 700 may terminate at block 707 and a restock notification will not be sent to the user. Instead, if one or more processors 305 determines that the quantity of the first product and/or the second product exceeds the predetermined threshold, method 700 may proceed to block 708. At block 708, one or more processors 305 may determine whether the first request for restock notification associated with the first product (block 701) is related to the second request for restock notification associated with the second product (block 702).

As discussed in reference to FIG. 5 above, for example, a batch framework may determine that the first request and the second request are both from the same user by, for example, identifying a user ID associated with each request in database 408. If the user ID associated with the first request is the same as the user ID associated with the second request, the batch framework may determine that the first request and the second request are from the same user. Then, the batch framework may determine whether the first request is related to the second request by, for example, comparing the product associated with each request. For example, the batch framework may determine whether the first product associated with the first request for restock notification is the same as the second product associated with the second request for restock notification. If the first product and the second product associated with the first and second requests, respectively, are the same, the batch framework may determine that the first request and the second request are related.

When the batch framework determines that the first and second requests for restock notifications are related, method 700 may proceed to block 710. At block 710, one or more processors 305 may configure the batch framework to generate a notification schedule such that one or more processors 305 only sends one restock notification for both the first product and the second product to the user, thereby preventing duplicate messages from being sent to users. On the other hand, the batch framework may determine that the first and second requests for restock notifications are not related. For example, the batch framework may determine that the first product associated with the first request for restock notification is not the same as the second product associated with the second request for restock notification. For instance, the user may have sent two different requests for restock notifications for two different products. When the batch framework determines that the first and second requests for restock notifications are not related, method 700 may proceed to block 709. At block 709, one or more processors 305 may send a first restock notification for the first product to the user and send a separate second restock notification for the second product to the user.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for providing restock notifications, the system comprising:
   a memory storing instructions; and
   at least one processor configured to execute the instructions to:
   receive, from a user interface associated with a user, a first request for a restock notification associated with a product;
   modify a database to assign a first status to the product;
   receive, from a second user interface associated with the user, a second request for a restock notification associated with a second product;
   modify the database to assign the first status to the second product;
   receive a message indicating that the product is available for purchase;
   modify the database to assign a second status to the product;
   receive a second message indicating that the second product is available for purchase;
   modify the database to assign the second status to the second product;
   configure a batch framework to periodically analyze the database to identify products with the second status assigned;
   configure the batch framework to determine whether the first request is related to the second request, wherein the product and the second product are the same when the first request is related to the second request;
   configure the batch framework to determine a notification schedule for sending at least one of the restock notification associated with the product or the restock notification associated with the second product to the user; and
   send one restock notification to the user based on the determined notification schedule, in response to the first request and the second request, when the first request is related to the second request.

2. The system of claim 1, wherein the user interface comprises at least one of a mobile application programming interface, a web browser, a mobile web browser, or a cart web browser.

3. The system of claim 1, wherein:
   the first status is indicative of a pending request for restock notification of an out-of-stock product; and
   the second status indicates that at least one of the product or the second product is in-stock and the restock notification is ready to be sent to the user.

4. The system of claim 1, wherein at least one of the message indicating that the product is available for purchase or the second message indicating that the second product is available for purchase comprises at least one of an item ID or a vendor item ID.

5. The system of claim 1, wherein the restock notification comprises at least one of a push notification for a mobile application or an email notification.

6. The system of claim 1, wherein the at least one processor is further configured to execute the instructions to:
   modify the database to assign a third status to at least one of the product or the second product, wherein the third status is indicative of a failure to send the restock notification to the user; and
   configure the batch framework to apply a failover logic to resend the restock notification to the user based on the determined notification schedule.

7. The system of claim 1, wherein the at least one processor is further configured to execute the instructions to:
   determine a quantity of at least one of the product or the second product after restocking; and
   send the restock notification to the user when the quantity exceeds a predetermined threshold.

8. The system of claim 1, wherein the at least one processor is further configured to execute the instructions to configure the batch framework to determine the notification schedule based on a time the user interacts with the user interface.

9. The system of claim 1, wherein:
   the notification schedule comprises an alert type; and
   the at least one processor is further configured to execute the instructions to adjust the alert type based on a scheduled time for sending the restock notification.

10. A computer-implemented method for providing restock notifications, the method comprising:
    receiving, from a user interface associated with a user, a first request for a restock notification associated with a product;
    modifying a database to assign a first status to the product;
    receiving, from a second user interface associated with the user, a second request for a restock notification associated with a second product;
    modifying the database to assign the first status to the second product;
    receiving a message indicating that the product is available for purchase;
    modifying the database to assign a second status to the product;
    receiving a second message indicating that the second product is available for purchase;
    modifying the database to assign the second status to the second product;
    configuring a batch framework to periodically analyze the database to identify products with the second status assigned;
    configuring the batch framework to determine whether the first request is related to the second request, wherein the product and the second product are the same when the first request is related to the second request;
    configuring the batch framework to determine a notification schedule for sending at least one of the restock notification associated with the product or the restock notification associated with the second product to the user; and
    sending one restock notification to the user based on the determined notification schedule, in response to the first request and the second request, when the first request is related to the second request.

11. The method of claim 10, wherein the user interface comprises at least one of a mobile application programming interface, a web browser, a mobile web browser, or a cart web browser.

12. The method of claim 10, wherein the restock notification comprises at least one of a push notification for a mobile application or an email notification.

13. The method of claim 10, wherein:
    the first status is indicative of a pending request for restock notification of an out-of-stock product; and the second status indicates that at least one of the product or the second product is in-stock and the restock notification is ready to be sent to the user.

14. The method of claim 10, further comprising:
modifying the database to assign a third status to at least one of the product or the second product, wherein the third status is indicative of a failure to send the restock notification to the user; and
configuring the batch framework to apply a failover logic to resend the restock notification to the user based on the determined notification schedule.

15. The method of claim 10, further comprising:
determining a quantity of at least one of the product or the second product after restocking; and
sending the restock notification to the user when the quantity exceeds a predetermined threshold.

16. The method of claim 10, further comprising configuring the batch framework to determine the notification schedule based on a time the user interacts with the user interface.

17. The method of claim 10, wherein the notification schedule comprises an alert type, and further comprising adjusting the alert type based on a scheduled time for sending the restock notification.

18. A computer-implemented system for providing restock notifications, the system comprising:
a memory storing instructions; and
at least one processor configured to execute the instructions to:
receive, from a first user interface associated with a user, a first request for a restock notification associated with a first product;
receive, from a second user interface associated with the user, a second request for a restock notification associated with a second product;
modify a database to assign a first status to the first product and the second product, wherein the first status is indicative of a pending request for restock notification of an out-of-stock product;
receive a first message indicating that the first product is available for purchase and a second message indicating that the second product is available for purchase;
modify the database to assign a second status to the first product and the second product, wherein:
the second status indicates that a product is in-stock and the restock notification is ready to be sent to the user;
configure a batch framework to periodically analyze the database to identify products with the second status assigned;
configure the batch framework to determine a notification schedule for sending the restock notification to the user;
configure the batch framework to determine whether the first request is related to the second request, wherein the first product and the second product are the same when the first request is related to the second request;
determine a quantity of the first product and the second product after restocking;
send one restock notification for the first product and the second product to the user based on the determined notification schedule, when:
the first request is related to the second request; and
when the quantity of the first product and the second product exceeds a predetermined threshold; and
send a first restock notification for the first product and a second restock notification for the second product based on the determined notification schedule, when:
the first request is not related to the second request; and
when the quantity of the first product and the second product exceeds a predetermined threshold.

* * * * *